United States Patent
Dodge et al.

(10) Patent No.: US 10,816,130 B2
(45) Date of Patent: Oct. 27, 2020

(54) COMPOSITE ARTICLE

(71) Applicant: BASF SE, Ludwigshafen am Rhein (DE)

(72) Inventors: Jeffrey A. Dodge, Plymouth, MI (US); Andre Kamm, Bohmte (DE); Charles E. Jones, Jr., Berkley, MI (US); Karl R. Gust, Clawson, MI (US)

(73) Assignee: BASF SE, Ludwigshafen am Rhein (DE)

(*) Notice: Subject to any disclaimer, the term of this patent is extended or adjusted under 35 U.S.C. 154(b) by 224 days.

(21) Appl. No.: 16/070,124

(22) PCT Filed: Jan. 13, 2017

(86) PCT No.: PCT/US2017/013395
§ 371 (c)(1),
(2) Date: Jul. 13, 2018

(87) PCT Pub. No.: WO2017/123915
PCT Pub. Date: Jul. 20, 2017

(65) Prior Publication Data
US 2019/0024839 A1 Jan. 24, 2019

Related U.S. Application Data

(60) Provisional application No. 62/279,029, filed on Jan. 15, 2016, provisional application No. 62/279,033, (Continued)

(51) Int. Cl.
*F16L 59/20* (2006.01)
*B32B 15/08* (2006.01)
(Continued)

(52) U.S. Cl.
CPC .............. *F16L 59/20* (2013.01); *B32B 15/08* (2013.01); *B32B 27/08* (2013.01); *B32B 27/308* (2013.01);
(Continued)

(58) Field of Classification Search
CPC ......... F16L 59/20; F16L 59/143; F16L 9/121; F16L 9/22; F16L 1/26; B32B 15/08;
(Continued)

(56) References Cited

U.S. PATENT DOCUMENTS

| 5,690,780 A | 11/1997 | Zharov et al. |
| 2014/0083604 A1 | 3/2014 | Gautriaud et al. |

FOREIGN PATENT DOCUMENTS

| CN | 1054136 | 7/2000 |
| CN | 101646871 A | 2/2010 |

(Continued)

OTHER PUBLICATIONS

International Search Report and Written Opinion from corresponding International Application No. PCT/US2017/013395; dated Apr. 21, 2017.
(Continued)

*Primary Examiner* — Michael C Miggins
(74) *Attorney, Agent, or Firm* — DLA Piper LLP (US)

(57) ABSTRACT

A composite article includes a low surface energy polymer layer, a poly(meth)acrylate layer, an epoxide layer, and a hydrolytically resistant layer. The poly(meth)acrylate layer is disposed on and in direct contact with the low surface energy polymer layer and includes the reaction product of at least one acrylate that is polymerized in the presence of an organoborane initiator, such that the poly(meth)acrylate includes boron. The epoxide layer is disposed on and in direct contact with the poly(meth)acrylate layer. The hydrolytically resistant layer is disposed on and in direct contact
(Continued)

with the epoxide and is the reaction product of an isocyanate component and an isocyanate-reactive component reacted in the presence of a curing agent. The isocyanate-reactive component includes a polydiene polyol and the curing agent crosslinks the carbon-carbon double bonds of the polydiene polyol.

15 Claims, 3 Drawing Sheets

Related U.S. Application Data filed on Jan. 15, 2016, provisional application No. 62/279,026, filed on Jan. 15, 2016, provisional application No. 62/279,027, filed on Jan. 15, 2016.

(51) Int. Cl.
| | |
|---|---|
| *B32B 27/08* | (2006.01) |
| *B32B 27/30* | (2006.01) |
| *B32B 27/32* | (2006.01) |
| *B32B 27/40* | (2006.01) |
| *C08J 7/04* | (2020.01) |
| *C09D 5/00* | (2006.01) |
| *C09D 133/10* | (2006.01) |
| *C09D 175/08* | (2006.01) |
| *F16L 9/12* | (2006.01) |
| *F16L 9/22* | (2006.01) |
| *F16L 59/14* | (2006.01) |
| *F16L 1/26* | (2006.01) |

(52) U.S. Cl.
CPC .............. *B32B 27/32* (2013.01); *B32B 27/40* (2013.01); *C08J 7/042* (2013.01); *C09D 5/00* (2013.01); *C09D 133/10* (2013.01); *C09D 175/08* (2013.01); *F16L 9/121* (2013.01); *F16L 9/22* (2013.01); *F16L 59/143* (2013.01); *B32B 2274/00* (2013.01); *B32B 2307/304* (2013.01); *B32B 2307/714* (2013.01); *B32B 2307/748* (2013.01); *B32B 2556/00* (2013.01); *B32B 2597/00* (2013.01); *C08J 2323/06* (2013.01); *C08J 2323/12* (2013.01); *C08J 2333/04* (2013.01); *C08J 2433/10* (2013.01); *C08J 2463/00* (2013.01); *C08J 2475/08* (2013.01); *F16L 1/26* (2013.01)

(58) Field of Classification Search
CPC ....... B32B 27/08; B32B 27/308; B32B 27/32; B32B 27/40; B32B 2274/00; B32B 2307/304; B32B 2307/714; B32B 2307/748; B32B 2556/00; B32B 2597/00; C08J 7/042; C08J 2333/04; C08J 2463/00; C08J 2323/06; C08J 2323/12; C08J 2433/10; C08J 2475/08; C09D 5/00; C09D 133/10; C09D 175/08
See application file for complete search history.

(56) References Cited

FOREIGN PATENT DOCUMENTS

| | | |
|---|---|---|
| CN | 102271911 A | 12/2011 |
| CN | 102898988 A | 1/2013 |
| EP | 2743284 A1 | 6/2014 |
| WO | 95/22567 | 8/1995 |
| WO | 97/07171 A1 | 2/1997 |
| WO | 2008/109863 A3 | 3/2008 |
| WO | 2009/027686 A1 | 3/2009 |
| WO | 2014/028444 A2 | 2/2014 |
| WO | 2015/081068 A1 | 6/2015 |
| WO | 2015/121620 A1 | 8/2015 |

OTHER PUBLICATIONS

First Office Action from corresponding Chinese Application No. 201780006644.3 dated Dec. 25, 2019, and its English translation.
First Office Action from counterpart Chinese Application No. 201780006643.9 dated Dec. 5, 2019, and its English translation.
First Office Action from corresponding Chinese Application No. 201780006642.4 dated Jan. 10, 2020, and its English translation.
Ye, Qingxuan et al., "Adhesive", China Material Publishing House, Oct. 1999, pp. 118-120, and a brief English summary.
Second Office Action from corresponding Chinese Patent Appln. No. 201780006642.4 dated Aug. 14, 2020, and its English translation.

COMPOSITE ARTICLE

CROSS-REFERENCE TO RELATED APPLICATIONS

This application claims priority to U.S. Provisional Application No. 62/279,033, filed Jan. 15, 2016; U.S. Provisional Application No. 62/279,027, filed Jan. 15, 2016; U.S. Provisional Application No. 62/279,026, filed Jan. 15, 2016; and U.S. Provisional Application No. 62/279,029, filed Jan. 15, 2016, the contents of each of which are incorporated herein by reference in their entirety.

FIELD OF THE DISCLOSURE

The present disclosure generally relates to a composite article and a method of forming the composite article. More particularly, the composite article includes a low surface energy polymer, a poly(meth)acrylate, an epoxide, and a hydrolytically resistant layer. The composite article may be used in subsea applications such as for use in subsea pipelines and other subsea structures.

BACKGROUND

Domestic energy needs currently outpace readily accessible energy resources, which has forced an increasing dependence on foreign petroleum fuels, such as oil and gas. At the same time, existing energy resources are significantly underutilized, in part due to inefficient oil and gas procurement methods.

Petroleum fuels, such as oil and gas, are typically procured from subsurface reservoirs via a wellbore that is drilled by a rig. In offshore oil and gas exploration endeavors, the subsurface reservoirs are beneath the ocean floor. To access the petroleum fuels, the rig drills into the ocean floor down to approximately one to two miles beneath the ocean floor. Various subsea pipelines and structures are utilized to transport the petroleum fuels from this depth beneath the ocean floor to above the surface of the ocean and particularly to an oil platform located on the surface of the ocean. These subsea pipelines and other structures may be made of a metallic material or a combination of metallic materials. The petroleum fuels, such as the oil, originating at a depth from about one to two miles beneath the ocean floor, are very hot (e.g. around 130° C.). In contrast, at this depth, the seawater is very cold (e.g. around 4° C.). This vast difference in temperature requires that the various subsea pipelines and structures be insulated to maintain the relatively high temperature of the petroleum fuels such that the fuels, such as oil and gas, can easily flow through the subsea pipelines and other subsea structures. Generally, if the fuel, such as oil, becomes too cold due to the temperature of the seawater, it will become too viscous to flow through the pipelines and other structures and will not be able to reach the ocean surface and/or oil platform. Even in instances where the fuel may be able to flow, the fuel may flow too slowly to reach the ocean surface and/or the oil platform in an efficient amount of time for the desired operating conditions. Alternatively and/or additionally, the fuel may form waxes that detrimentally act to clog the pipelines and structures. Yet further, due to the cold temperature of the seawater, the fuel may form hydrates that detrimentally change the nature of the fuel and may also act to clog the pipelines and structures.

In other examples, pipelines may be as long as 50 miles and may be both above water and below water. While traveling over such distances, the fuel is exposed to many temperature changes. To complicate these instances, the fuel must also travel, in the pipelines, 50 miles through these temperature changes and from one to two miles beneath the ocean floor to the oil platform above the ocean surface, without losing its integrity. For example, the fuel may need to have a low viscosity to remain flowable during these distances and may need to be adequately uniform, e.g., without detrimental hydrates and waxes.

In view of these types of issues, subsea structures are typically constructed by coating a central tube or passageway with insulation. However, during construction, the ends of the structures typically are non-insulated to allow for welding or other connections to be made to extend the length of the structures. For that reason, the subsea structures must be patched after welding with a polymer to ensure continuity of insulation and overall integrity. However, in many instances, the adhesion (or peel) strength of the applied patch to the substrate is poor, as is the hydrolysis resistance of the resultant patch. Accordingly, there remains an opportunity for improvement.

SUMMARY OF THE DISCLOSURE

The present disclosure provides a composite article that has a first layer including a low surface energy polymer, a poly(meth)acrylate layer disposed on and in direct contact with said first layer, an epoxide layer disposed on and in direct contact with said poly(meth)acrylate layer, and a hydrolytically resistant layer disposed on and in direct contact with said epoxide layer. The poly(meth)acrylate layer includes the reaction product of at least one (meth)acrylate that is polymerized in the presence of an organoborane initiator. The hydrolytically resistant layer includes a hydrolytically resistant polyurethane elastomer and is the reaction product of an isocyanate component and an isocyanate-reactive component reacted in the presence of a curing agent. The isocyanate-reactive component includes a polydiene polyol having an average hydroxy functionality of no greater than about 3 and a number average molecular weight of from about 1000 to less than about 3000 g/mol. The curing agent crosslinks the carbon-carbon double bonds of the polydiene polyol. The hydrolytically resistant layer has an initial tensile strength as measured in accordance with the DIN 53504 S2 standard test method, and wherein said hydrolytically resistant layer retains at least 80% of said initial tensile strength as measured in accordance with the DIN 53504 S2 standard test method and after submersion in standardized seawater for at least about 24 weeks at 102° C. in accordance with ASTM D665.

The present disclosure also provides for the related subsea structures including the composite articles, as well as the associated method for forming the composite articles.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 3:
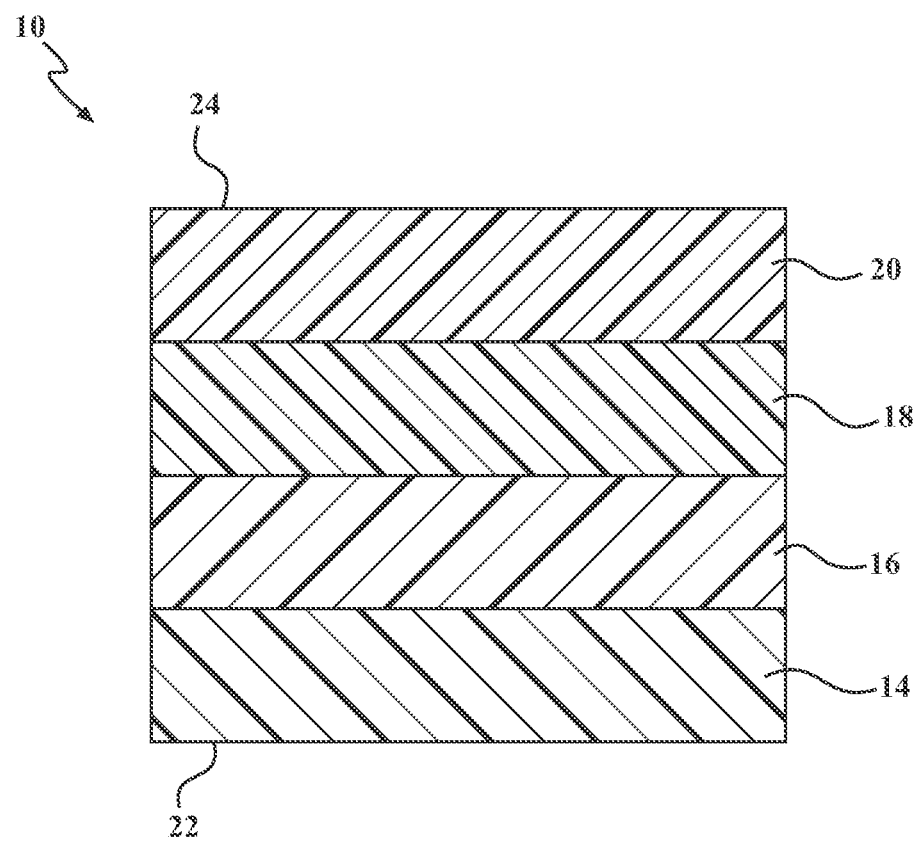
FIG. 3 is a side cross-section of one embodiment of the composite article of this disclosure.

The present disclosure includes a composite article (10). The composite article (10) typically includes four layers stacked upon one another, as shown in FIG. 3. In various embodiments, the composite article (10) includes, is, consists of, or consists essentially of, a first layer (14), a poly(meth)acrylate layer (16), an epoxide layer (18), and a hydrolytically resistant layer (20). The first layer (14) includes, is, consists of, or consists essentially of, a polymer that has a low surface energy. The first layer (14) may be described as a polymer layer. The poly(meth)acrylate layer (16) includes, is, consists of, or consists essentially of, a poly(meth)acrylate. The epoxide layer (18) includes, is, consists of, or consists essentially of, an epoxide. The hydrolytically resistant layer (20) may be described as a hydrolytically resistant polymer layer. The hydrolytically resistant layer (20) includes, is, consists of, or consists essentially of, a hydrolytically resistant elastomer. In certain embodiments, the hydrolytically resistant layer (20) includes, is, consists of, or consists essentially of, a hydrolytically resistant polyurethane elastomer layer. The poly (meth)acrylate layer (16), the epoxide layer (18), and the hydrolytically resistant layer (20) may be described as additional layers, as second, third, or fourth layers, etc. In various embodiments, the first layer (14) is described as a first outermost layer (22). In other embodiments, the hydrolytically resistant layer (20) is described as a second (e.g. outermost) layer (24). In still other embodiments, the poly (meth)acrylate layer (16) and the epoxide layer (18) are each described as second and/or third layers. Each of these layers is described in greater detail below. The terminology "consist essentially of" above describes embodiments that may be free of extraneous polymers or monomers that are reacted to form polymers. Relative to the composite article (10) itself, the terminology "consists essentially of" may describe embodiments that are free of additional layers, e.g. as whole layers or as partial layers.

The composite article (10) typically has increased peel strength (i.e., 90° peel strength), e.g. as compared to a composite article (10) that is free of the (meth)acrylate layer and/or the epoxide layer (18). In various embodiments, the composite article (10) has a 90° peel strength (which may be an average or mean peel strength) of at least 55, 60, 65, 70, 75, 80, 85, 90, 95, 100, 55 to 100, 60 to 95, 65 to 85, 70 to 80, 75 to 80, or 80 to 85, pli (pounds per linear inch, with 1 pound per linear inch corresponding to 1178.57967 grams per linear centimeter) measured using ASTM D6862. Typically, these values are reported as an average peel strength.

In alternative embodiments, all values and ranges of values between the aforementioned values are hereby expressly contemplated.

Peel strength can be measured between many different layers. For example, the aforementioned peel strength may be measured between the hydrolytically resistant layer (20) and the epoxide layer (18). Alternatively, the peel strength may be measured between the hydrolytically resistant layer (20) and the poly(meth)acrylate layer (16) or the hydrolytically resistant layer (20) and the first layer (14). The peel strength is related to the type of failure of the composite article (10) when force is applied. For example, when peel strength is measured, the hydrolytically resistant layer (20) may begin to peel away from another layer, e.g., the epoxide layer (18). Alternatively, when peel strength is measured, the hydrolytically resistant layer (20) may break apart/away from the composite article (10) and, for example, the epoxide layer (18). This is typically described in the art as cohesive failure. Typically, cohesive failure is preferred.

First Layer (14):

The first layer (14) of the composite article (10) may include, be, consist essentially of, or consist of, a low surface energy polymer. The terminology "low surface energy" typically describes a polymer that has a surface energy of less than about 40 mN/m (milli-Newtons per meter), as determined at 20° C. by ASTM D7490-13.

In various embodiments, the low surface energy polymer is chosen from polyethylene, polypropylene, and combinations thereof. In still other embodiments, the low surface energy polymer is chosen from those set forth immediately below and combinations thereof.

| Name | CAS Ref -No. | Surface free energy (SFE) at 20° C. in mN/m |
|---|---|---|
| Polystyrene PS | 9003-53-6 | 40.7 |
| Polyamide-12 PA-12 | 24937-16-4 | 40.7 |
| Poly-a-methyl styrene PMS (Polyvinyltoluene PVT) | 9017-21-4 | 39 |
| Polyethylacrylate PEA | 9003-32-1 | 37 |
| Polyvinyl fluoride PVF | 24981-14-4 | 36.7 |
| Polyvinylacetate PVA | 9003-20-7 | 36.5 |
| Polyethylmethacrylate PEMA | 9003-42-3 | 35.9 |
| Polyethylene-linear PE | 9002-88-4 | 35.7 |
| Polyethylene-branched PE | 9002-88-4 | 35.3 |
| Polycarbonate PC | 24936-68-3 | 34.2 |
| Polyisobutylene PM | 9003-27-4 | 33.6 |
| Polytetramethylene oxide PTME (Polytetrahydrofurane PTHF) | 25190-06-1 | 31.9 |
| Polybutylmethacrylate PBMA | 25608-33-7 | 31.2 |
| Polychlorotrifluoroethylene PCTrFE | 25101-45-5 | 30.9 |
| Polyisobutylmethacrylate PIBMA | 9011-15-8 | 30.9 |
| Poly(t-butylmethacrylate) PtBMA | — | 30.4 |
| Polyvinylidene fluoride PVDF | 24937-79-9 | 30.3 |
| Polypropylene-isotactic PP | 25085-53-4 | 30.1 |
| Polyhexylmethacrylate PHMA | 25087-17-6 | 30 |
| Polytrifluoroethylene P3FEt/PTrFE | 24980-67-4 | 23.9 |
| Polytetrafluoroethylene PTFE | 9002-84-0 | 20 |
| Polydimethylsiloxane PDMS | 9016-00-6 | 19.8 |

The first layer (14) may be an outermost layer of the composite article (10) or may be an interior layer of a larger article. If an outermost layer, the first layer (14) is free of contact with any other layer an external side and faces the environment on that side.

The first layer (14) is not limited to any particular dimensions or thickness. In various embodiments, the first layer (14) has a thickness of from 0.1 inches to 1 foot or more (with 1 inch equal to about 2.54 cm and wherein 1 foot equal to about 30.48 cm). In various embodiments, the thickness is from 0.25 to 6 inches, from 0.25 to 3 inches, from 0.25 to 1 inch, from 0.25 to 0.75, or from 0.25 to 0.5, inches (with 1 inch equal to about 2.54 cm). In various non-limiting embodiments, all values and ranges of values between the aforementioned values are hereby expressly contemplated.

Poly(meth)acrylate Layer (16):

The composite article (10) also includes the poly(meth) acrylate layer (16). The poly(meth)acrylate layer (16) is disposed on and in direct contact with the first layer (14). In other words, there is no intermediate layer or tie layer disposed between the poly(meth)acrylate layer (16) and the first layer (14). The poly(meth)acrylate layer (16) may be include, consist essentially of, or consist of, a poly(meth) acrylate.

The poly(meth)acrylate itself may include, consist essentially of, or consist of, the reaction product of at least one acrylate that is polymerized in the presence of an organoborane initiator. The terminology "consist essentially of" describes an embodiment that is free of polymer or monomers that are reacted to form polymers. The at least one acrylate may be a single acrylate, two acrylates, three acrylates, etc, each of which may independently be an acrylate or a methacrylate (collectively alternatively referred to as (meth)acrylate). The (meth)acrylate may be described as a (meth)acrylate that has 3 to 20 carbon atoms, e.g. 3, 4, 5, 6, 7, 8, 9, 10, 11, 12, 13, 14, 15, 16, 17, 18, 19, or 20, carbon atoms or any range of values. In other embodiments, the (meth)acrylate is chosen from hydroxypropyl methacrylate, 2-ethylhexylacrylate, acrylic acid, and combinations thereof In further embodiments, the (meth)acrylate is chosen from 2-ethylhexylacrylate, 2-ethylhexylmethacrylate, methylacrylate, methylmethacrylate, butylacrylate, ethyl acrylate, hexylacrylate, isobutylacrylate, butylmethacrylate, ethylmethacrylate, isooctylacrylate, decylacrylate, dodecylacrylate, vinyl acrylate, acrylic acid, methacrylic acid, neopentylglycol diacrylate, neopentylglycoldimethacrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, glycidyl acrylate, glycidyl methacrylate, allyl glycidyl ether, allyl acrylate, allyl methacrylate, stearyl acrylate, stearyl methacrylate, tetrahydrofurfuryl acrylate, 2-hydroxyethyl acryl ate, 2-hydroxyethyl methacrylate, diethyleneglycol diacrylate, diethyleneglycol dimethacrylate, dipropyl eneglycol diacrylate, dipropyleneglycol dimethacrylate, polyethyleneglycol diacrylate, polyethyleneglycol dimethacrylate, polypropyleneglycol diacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, N-vinyl pyrrolidone, N-vinyl caprolactam, N-isopropyl acrylamide, N,N-dimethylacrylamide, t-octyl acrylamide, cyanotethylacrylates, diacetoneacrylamide, N-vinylacetamide, N-vinylformamide, polypropyleneglycol dimethacrylate, trimethylolpropanetriacrylate, trimethylolpropanetrimethacrylate, ethoxylated trimethylolropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, and combinations thereof. The at least one (meth)acrylate may include only acrylate or methacrylate functionality. Alternatively, the at least one (meth)acrylate may include both acrylate functionality and methacrylate functionality.

In various embodiments, the at least one (meth)acrylate is chosen from monofunctional acrylates and methacrylate esters and substituted derivatives thereof such as cyano, chloro, amino and silane derivatives as well as blends of substituted and unsubstituted monofunctional acrylate and methacrylate esters. In other embodiments, the at least one (meth)acrylate is chosen from lower molecular weight methacrylate esters and amides such as methyl methacrylate, ethyl methacrylate, butyl methacrylate, methoxy ethyl methacrylate, cyclohexyl methacrylate, tetrahydrofurfuryl methacrylate, N,N-dimethyl methacrylamide and blends thereof. In still other embodiments, the at least one (meth)acrylate is chosen from methyl acrylate, ethyl acrylate, isobornyl methacrylate, butyl acrylate, n-octyl acrylate, 2-ethylhexyl acrylate, 2-ethylhexyl methacrylate, decylmethacrylate, dodecyl methacrylate, tert-butyl methacrylate, acrylamide, N-methyl acrylamide, diacetone acrylamide, N-tert-butyl acrylamide, N-tert-octyl acrylamide, N-decyl methacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like. In further embodiments, the at least one (meth)acrylate is chosen from alkyl acrylates having 4 to 10 carbon atoms in the alkyl group, such as blends of methyl methacrylate and butylacrylate. In even further embodiments, the at least one (meth)acrylate is chosen from hexanedioldiacrylate, ethylene glycol dimethacrylate, ethylene glycol diacrylate, triethylene glycol dimethacrylate, polyethylene glycol diacrylate, tetraethylene glycol di(meth)acrylate, glycerol diacrylate, diethyleneglycol dimethacrylate, pentaerythritol triacrylate, trimethylolpropane trimethacrylate, as well as other polyether diacrylates and dimethacrylates.

In further embodiments, the at least one (meth)acrylate has the formula:

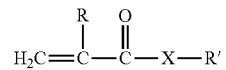

wherein R and R' are each hydrogen or organic radicals, and X is oxygen. Blends of (meth)acrylic monomers may also be used. The at least one (meth)acrylate may be monofunctional, polyfunctional or a combination thereof.

The at least one (meth)acrylate is polymerized in the presence of an organoborane initiator to form the poly(meth)acrylate. This polymerization typically results in the poly(meth)acrylate including amounts of boron that remain from the organoborane initiator (e.g., in the form of oxidized by-products). In other words, the organoborane initiator includes boron atoms. After reaction to form the poly(meth)acrylate, some of the boron atoms may remain in the poly(meth)acrylate. As just one example, the presence of the boron atoms may differentiate the poly(meth)acrylate formed in the presence of the organoborane initiator from other poly(meth)acrylate formed using different initiation mechanisms or different initiators. In various embodiments, the amount of boron atoms in the poly(meth)acrylate may be from 10 to 10,000,000, from 10 to 1,000,000, from 10 to 100,000, from 100 to 10,000, from 100 to 5,000, from 500 to 5,000, or from 500 to 2,000, parts by weight per one million parts by weight (ppm) of the at least on (meth)acrylate or of the poly(meth)acrylate. In alternative embodiments, all values and ranges of values between the aforementioned values are hereby expressly contemplated.

The organoborane initiator may be any organoborane compound known in the art capable of generating free radicals. In various embodiments, the organoborane initiator includes tri-functional boranes which include the general structure:

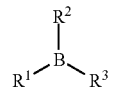

wherein each of $R^1$-$R^3$ independently has from 1 to 20 carbon atoms and wherein each of $R^1$-$R^3$ independently comprise one an aliphatic hydrocarbon group and an aromatic hydrocarbon group. The aliphatic and/or aromatic hydrocarbon groups may be linear, branched, and/or cyclic. Suitable examples of the organoborane include, but are not limited to, tri-methylborane, tri-ethylborane, tri-n-butylborane, tri-n-octylborane, tri-sec-butylborane, tri-dodecylborane, phenyldiethylborane, and combinations thereof. In one embodiment, the organoborane includes tri-n-butylborane.

The organoborane initiator may be derived from decomplexation of an air-stable complex of an organoborane compound and an organonitrogen compound. In one embodiment, the organoborane initiator is further defined as an organoborane-organonitrogen complex. Suitable organoborane initiators include, but are not limited to, organoborane-amine complexes, organoborane-azole complexes, organoborane-amidine complexes, organoborane-heterocyclic nitrogen complexes, amido-organoborate complexes, and combinations thereof. In one embodiment the organoborane-amine complex is or includes a trialkylborane-amine complex. In one embodiment, the organoborane initiator is further defined as an organoborane-amine complex. A typical organoborane-amine complex includes a complex formed between an organoborane and a suitable amine that renders the organoborane-amine complex stable at ambient conditions. Any organoborane-amine complex known in the art may be used. Typically, the organoborane-amine complex is capable of initiating polymerization or cross-linking of the radical curable organic compound through introduction of an amine-reactive compound, and/or by heating. That is, the organoborane-amine complex may be destabilized at ambient temperatures through exposure to suitable amine-reactive compounds. Heat may be applied if needed or desired. The organoborane-amine complex typically has the formula:

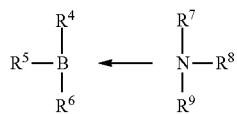

wherein B represents boron. Additionally, each of $R^4$, $R^5$, and $R^6$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^4$, $R^5$, and $R^6$ includes one or more silicon atoms, and is covalently bonded to boron. Further, each of $R^7$, $R^8$, and $R^9$ typically yields an amine compound or a polyamine compound capable of complexing the boron. Two or more of $R^4$, $R^5$, and $R^6$ and two or more of $R^7$, $R^8$, and $R^9$ typically combine to form heterocyclic structures, provided a sum of the number of atoms from $R^4$, $R^5$, $R^6$, $R^7$, $R^8$, and $R^9$ does not exceed 11.

Additionally, any amine known in the art may be used to form the organoborane-amine complex. Typically, the amine includes at least one of an alkyl group, an alkoxy group, an imidazole group, an amidine group, an ureido group, and combinations thereof. Particularly suitable amines include, but are not limited to, 1,3 propane diamine, 1,6-hexanediamine, methoxypropylamine, pyridine, isophorone diamine, and combinations thereof The organoborane initiator may be used in any amount to form the poly(meth)acrylate. Typically, the organoborane initiator is used in an amount equivalent to of from 0.01 to 95, more typically of from 0.1 to 80, even more typically of from 0.1 to 30, still more typically of from 1 to 20, and most typically of from 1 to 15 parts by weight per 100 parts by weight of the poly(meth)acrylate. The amounts of the organoborane initiator typically depend upon a molecular weight and functionality of the organoborane initiator and the presence of other components such as fillers. The amounts of the organoborane initiator typically depend upon a molecular weight and functionality of the organoborane initiator and the presence of other components such as fillers. In various embodiments, the amount used is based on percent boron in the reaction mixture, calculated by the weight of active ingredients/components (e.g. acrylic monomers).

In addition to the organoborane initiator, a reactive compound, such as a decomplexer, may also be utilized or may be omitted (if the decomplexer is omitted, heat is used to initiate the reaction). For example, an organoborane-organonitrogen complex (acting as the organoborane initiator) may interact with a nitrogen-reactive compound to initiate polymerization or cross-linking of the at least one acrylate. This allows the at least one (meth)acrylate to polymerize at low temperatures and with decreased reaction times. Typically this occurs when the nitrogen-reactive compound is mixed with the organoborane-organonitrogen complex and exposed to an oxygenated environment at temperatures below a dissociation temperature of the organoborane-organonitrogen complex, including room temperature and below. The amine-reactive nitrogen-reactive compound may be or include any nitrogen-reactive compound known in the art and can be delivered as a gas, liquid, or solid. In one embodiment, the nitrogen-reactive compound includes free radical polymerizable groups or other functional groups such as a hydrolyzable group, and can be monomeric, dimeric, oligomeric or polymeric. In various embodiments, the organoborane-amine complex includes a trialkylborane-amine complex. In other embodiments, the amine-reactive compound is chosen from acids, anhydrides, and combinations thereof.

In various embodiments, the nitrogen-reactive compound is chosen from the group of an acid, an anhydride, and combinations thereof. In other embodiment, the nitrogen-reactive compound includes nitrogen-reactive groups, such as amine-reactive groups. It is contemplated that the nitrogen-reactive groups may be derived from the organoborane-organonitrogen complex and/or any additives present. The nitrogen-reactive compound may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof In one embodiment, the amine-reactive compound is selected from the group of isophorone diisocyanate, hexamethylenediisocyanate, toluenediisocyanate, methyldiphenyldiisocyanate, acrylic acid, methacrylic acid, 2-hydroxyethylacrylate, 2-hydroxymethylacrylate, 2-hydroxypropylacrylate, 2-hydroxypropylmethacrylate, methacrylic anhydride, undecylenic acid, citraconic anhydride, polyacrylic acid, polymethacrylic acid, and combinations thereof. In yet another embodiment, the nitrogen-reactive compound is selected from the group of oleic acid, undecylenic acid, polymethacrylic acid, stearic acid, citric acid, levulinic acid, and 2-carboxyethyl acrylate, and combinations thereof. In another embodiment, the nitrogen-reactive compound may include, but is not limited to, acetic acid, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, compounds capable of generating nitrogen-reactive groups when exposed to ultraviolet radiation such as photoacid generators and iodonium salts including [SbF$_6$]— counter ions. With such ultraviolet photoacid generators, a photosensitizing compound such as isopropylthioxanthone may be included.

In various embodiments, the decomplexer includes at least one free radically polymerizable group and at least one nitrogen-reactive group in the same molecule. Examples of useful decomplexers include the following: $(A)_a$-Y-$(B)_b$ wherein "A" is a group that is capable of forming a covalent bond with an acrylate, "B" is a group that is capable of forming a covalent bond with a nitrogen (e.g. amine) portion of the organoborane-organonitrogen complex, "Y" is a polyvalent organic linking group; "a" represents the number of free radically polymerizable groups, and "b" represents the number of nitrogen-reactive groups.

Group "A" may include free radically polymerizable groups such as alkene groups. The alkene group may be unsubstituted or substituted or part of a cyclic ring structure. Substituted alkenes include, for example, those alkenes having alkyl aryl group substitution. Typical alkenes are those having terminal unsubstituted double bonds such as allyl groups. Other alkenes are styryls and acrylics.

Group "B" may include an isocyanate group. Typically, the value of each of "a" and "b" is at least one. Preferably, the sum of "a" and "b" is less than or equal to six, more preferably less than or equal to four, most preferably two.

Group "Y" may include a variety of different chemical structures depending on the reagents used to prepare the decomplexer. The decomplexer may include the reaction product of a hydroxyl compound containing a free radically polymerizable group and a polyisocyanate.

The decomplexer/nitrogen-reactive compound may be used in an amount equivalent to of from 0.1 to 95, more typically of from 0.1 to 90, and most typically of from 1 to 20, parts by weight per 100 parts by weight of the poly (meth)acrylate. The amount of the nitrogen-reactive compound may depend upon a molecular weight and functionality of the nitrogen-reactive compound and the presence of other components such as fillers. In another embodiment, the nitrogen-reactive compound is typically used in an amount wherein a molar ratio of nitrogen-reactive groups to nitrogen groups in the poly(meth)acrylate is of from 0.1 to 100, more typically from 0.5 to 50, and most typically from 0.8 to 20.

In various embodiments, the poly(meth)acrylate, the at least one (meth)acrylate, the organoborane initiator, the decomplexer, etc. may each be independently as described in U.S. Pat. No. 5,990,036, which is expressly incorporated herein in its entirety in various non-limiting embodiments.

The poly(meth)acrylate layer (16) is not limited to any particular dimensions or thickness. In various embodiments, the poly(meth)acrylate layer (16) has a wet film thickness of from 0.025 to 0.5, from 0.050 to 0.5, from 0.025 to 0.1, from 0.025 to 0.05, from 0.05 to 0.1, or from 0.05 to 0.5, inches (with 1 inch equal to about 2.54 cm). Still further, various embodiments, the poly(meth)acrylate layer (16) has a wet film thickness of 0.050, 0.055, 0.060, 0.065, 0.070, 0.075, 0.080, 0.085, 0.090, 0.095, or 0.100 inches (again with 1 inch equal to about 2.54 cm). In various non-limiting embodiments, all values and ranges of values between the aforementioned values are hereby expressly contemplated. In various non-limiting embodiments, there is no maximum film thickness per se.

Epoxide layer (18):

Referring now to the epoxide layer (18), the epoxide layer (18) is disposed on and in direct contact with the poly(meth) acrylate layer (16). In other words, there is no intermediate layer or tie layer disposed between the poly(meth)acrylate layer (16) and the epoxide layer (18). The epoxide layer (18) may be include, consist essentially of, or consist of, an epoxide. The epoxide layer (18), and the epoxide itself, are typically formed from an epoxide composition. The epoxide layer (18) may be alternatively described as a "tie layer" or "tie coat" between the hydrolytically resistant layer (20) and the poly(meth)acrylate layer (16). In various embodiments, the epoxide layer (18) is utilized to prevent the hydrolytically resistant layer (20) from contacting the poly(meth) acrylate layer (16). For example, if a composition that is used to form the hydrolytically resistant layer (20) (that may include an isocyanate and a polyol) were poured onto the poly(meth)acrylate layer (16), undesirable foaming may occur. Therefore, the epoxide layer (18) can be used to minimize or eliminate this foaming by minimizing or eliminating contact between the hydrolytically resistant layer (20) and the poly(meth)acrylate layer (16).

The epoxide composition may include an epoxy compound and a hardener. Alternatively, the epoxide composition may be formed from the reaction of an epoxy compound (such as an epoxy resin) and a hardener. The epoxy resin chosen from epoxy resins which are liquid and insoluble in water, and which have low viscosity and little water permeability. In various embodiments, the epoxy resin is an ordinary glycidyl ether type epoxy resin including bisphenol A type, bisphenol AD type, novolak type, bisphenol F type, and brominated bisphenol A type, special epoxy resins such as glycidyl ester type epoxy resins, glycidyl amine type epoxy resins, and heterocyclic epoxy resins, and various modified epoxy resins. In various embodiments, epoxy resins useful herein include liquids, solids, and mixtures thereof. For example, the epoxy resins can also be described as polyepoxides such as monomeric polyepoxides (e.g. the diglycidyl ether of bisphenol A, diglycidyl ether of bisphenol F, diglycidyl ether of tetrabromobisphenol A, novolac-based epoxy resins, and tris-epoxy resins), higher molecular weight resins (e.g. the diglycidyl ether of bisphenol A advanced with bisphenol A) or polymerized unsaturated monoepoxides (e.g. glycidyl acrylates, glycidyl methacrylate, allyl glycidyl ether, etc.) to homopolymers or copolymers. In various embodiments, epoxy compounds include, on the average, at least one pendant or terminal 1,2-epoxy group (i.e., vicinal epoxy group) per molecule. Solid epoxy resins that may be used can include or be based on Bisphenol A. For example, a suitable epoxy resin is diglycidyl ether of bisphenol A Dow Chemical DER 664 UE solid epoxy.

The bisphenol type epoxy resins can be produced via reaction between 2,2-bis(4-hydroxyphenyl)propane, i.e., bisphenol A and haloepoxides such as epichlorohydrin or beta-methylepichlorohydrin. Bisphenol AD type epoxy resins can be produced via reaction between 1,1-bis(4-hydroxyphenyl)ethane, i.e., bisphenol AD and haloepoxides such as epichlorohydrin or beta-methylepichlorohydrin. Bisphenol F type epoxy resins can be produced through reaction between bis(4-hydroxyphenyl)methane i.e. bisphenol F and haloepoxides such as epichlorohydrin or beta-methylepichlorohydrin.

A modifying resin may also be blended with the epoxy resin and chosen from a coumarone-indene polymer resin, a dicyclopentadiene polymer resin, an acrylonitrile modified polyvinyl chloride resin, an amino terminated acrylonitrile-butadiene copolymer resin, and an epoxy terminated polybutadiene resin.

The hardener is typically capable of cross-linking with epoxy groups on the epoxy resin. Any hardener, e.g., suitable for a 2K epoxy, may be used. Typical hardeners include polymeric amines (polyamines) and polymeric amides (polyamides) (including, e.g., polyamidoamines), low molecular weight amines, and combinations thereof In various embodiments, an amine is chosen from cycloaliphatic polyamine, an aliphatic/aromatic polyamine, and an amine adduct. The amine may be a linear aliphatic polyamine, aromatic polyamine, acid anhydride, imidazole, or an amine chosen from a cycloaliphatic polyamine, an aliphatic/aromatic polyamine, and an amine adduct. In various embodiments, the amine is isophorone diamine and/or m-xylylene diamine. In additional embodiments, the amine adduct is an adduct of a polyamine with an epoxy or similar resin. More particularly, the amine adducts can include polyamines such as m-xylylene diamine and isophorone diamine to which various epoxy resins such as bisphenol A epoxy resins can be added. The epoxy resins which can form adducts with the polyamines are as described above.

In various embodiments, the amine includes a polyetheramine-epoxy adduct, that is, a reaction product of a stoichiometric excess of an amine prepolymer with an epoxy resin. The amine may be any amine prepolymer that has at least two amine groups in order to allow cross-linking to take place. The amine prepolymer may include primary and/or secondary amine groups, and typically includes primary amine groups. Suitable amine prepolymers include polyether diamines and polyether triamines, and mixtures thereof. Polyether triamine is preferred in one embodiment. The polyether amines may be linear, branched, or a mixture.

Branched polyether amines are preferred in one embodiment. Any molecular weight polyetheramine may be used, with molecular weights in the range of 200-6000 or above being suitable. Molecular weights may be above 1000, or more preferably above 3000. Molecular weights of 3000 or 5000 are preferred in various embodiments. Suitable commercially available polyetheramines include those sold by Huntsman under the Jeffamine trade name. Suitable polyether diamines include Jeffamines in the D, ED, and DR series. These include Jeffamine D-230, D-400, D-2000, D-4000, HK-511, ED-600, ED-900, ED-2003, EDR-148, and EDR-176. Suitable polyether triamines include Jeffamines in the T series. These include Jeffamine T-403, T-3000, and T-5000. Polyether triamines are preferred in various embodiments, and a polyether triamine of molecular weight about 5000 (e.g., Jeffamine T-5000) is most preferred in another embodiment. The equivalents of any of the above may also be used in partial or total replacement.

In further embodiments, the epoxy composition includes 5 to 30 parts by weight of the epoxy compound, 0 to 35 parts by weight of the modifying resin, and a balance of the amine curing agent, per 100 parts by weight of the composition.

The epoxide composition may also include one or more curing accelerators (catalysts). The curing accelerator typically functions by catalyzing reaction of the epoxy resin and the amine (or hardener). The curing accelerator may include a tertiary amine, such as 2,4,6-tris(dimethylamino-methyl) phenol, available from Air Products under the name Ancamine K54. Other amines are described in U.S. Pat. No. 4,659,779 which is expressly incorporated herein by reference in its entirety in various non-limiting embodiments.

In various embodiments, the reaction of the epoxy resin and the amine is as follows:

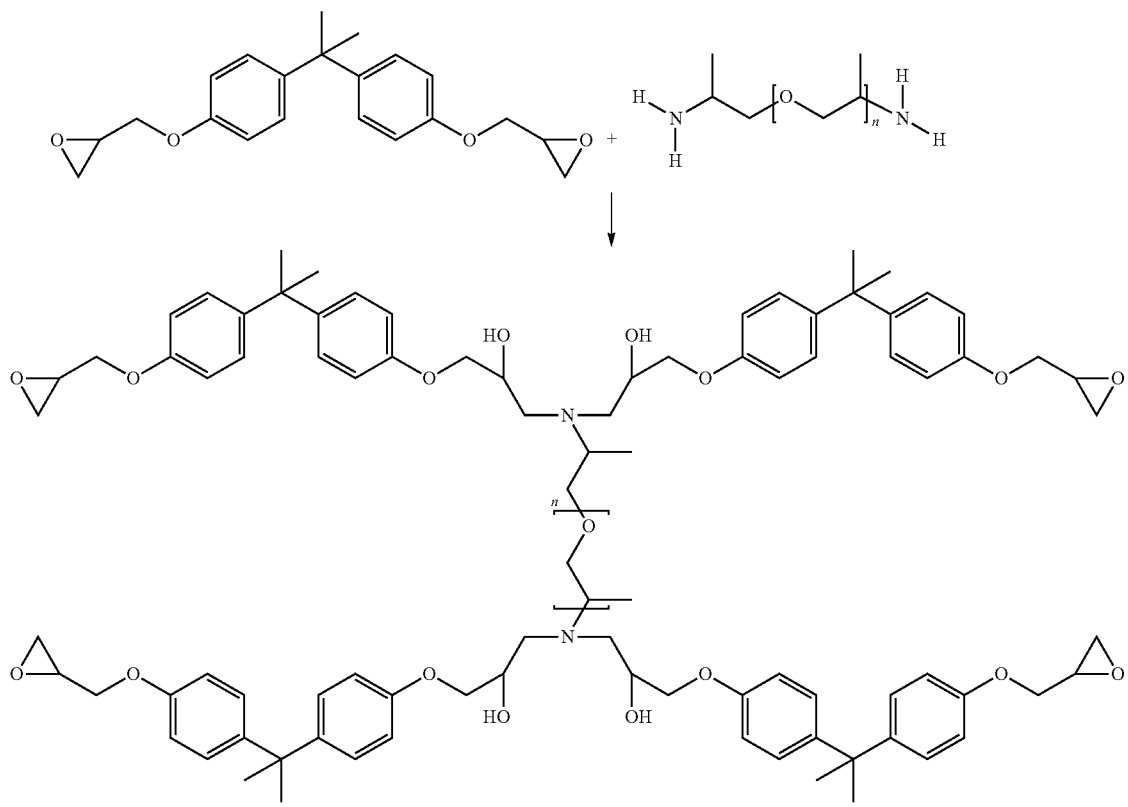

wherein n is from 5 to 75.

The epoxide layer (18) is not limited to any particular dimensions or thickness. In various embodiments, the epoxide layer (18) has a wet film thickness of from 0.010 to 0.5, from 0.025 to 0.5, from 0.050 to 0.5, from 0.025 to 0.1, from 0.025 to 0.05, from 0.05 to 0.1, or from 0.05 to 0.5, inches (with 1 inch equal to about 2.54 cm). In various non-limiting embodiments, all values and ranges of values between the aforementioned values are hereby expressly contemplated.

Hydrolytically Resistant Layer (20):

The hydrolytically resistant layer (20) is disposed on and in direct contact with the epoxide layer (18). In other words, there is no intermediate layer or tie layer disposed between the hydrolytically resistant layer (20) and the epoxide layer (18). The hydrolytically resistant layer (20) may be include, consist essentially of, or consist of, a hydrolytically resistant elastomer. The hydrolytically resistant elastomer may be a polyurethane elastomer. The polyurethane elastomer may be formed from a polyurethane elastomer composition. This composition may include the reaction product of an isocyanate component and an isocyanate-reactive component.

A hydrolytically resistant material, as defined herein, such as the hydrolytically resistant elastomer, is a material (or elastomer) that is resistant to degradation in water.

The isocyanate component may be, include, consist essentially of, or consist of, any isocyanate known in the art, e.g., aliphatic isocyanates, aromatic isocyanates, polymeric isocyanates, or combinations thereof. The isocyanate component may be, include, consist essentially of, or consist of, more than one different isocyanate, e.g., polymeric diphenylmethane diisocyanate and 4,4'-diphenylmethane diisocyanate. In various embodiments, the isocyanate is chosen fron diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

In various embodiments, the isocyanate component typically includes, but is not limited to, isocyanates, diisocyanates, polyisocyanates, and combinations thereof. In one embodiment, the isocyanate component includes an n-functional isocyanate. In this embodiment, n is a number typically from 2 to 5, more typically from 2 to 4, still more typically of from 2 to 3, and most typically about 2. It is to be understood that n may be an integer or may have intermediate values from 2 to 5. The isocyanate component typically includes an isocyanate selected from the group of aromatic isocyanates, aliphatic isocyanates, and combinations thereof In another embodiment, the isocyanate component includes an aliphatic isocyanate such as hexamethylene diisocyanate (HDI), dicyclohexyl-methyl-diisocyanate (H12MDI), isophorone-diisocyanate, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof Alternatively, the isocyanate component can include an aromatic isocyanate. If the isocyanate component includes an aromatic isocyanate, the aromatic isocyanate typically corresponds to the formula $R'(NCO)_z$ wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may be an isocyanate pre-polymer. The isocyanate pre-polymer may be a reaction product of an isocyanate and a polyol and/or a polyamine. The isocyanate used in the pre-polymer can be any isocyanate as described above.

The polyol used to form the pre-polymer may be one or more polyols described herein typically having a number average molecular weight (Mn) of 400 g/mol or greater, with (Mn) measured by conventional techniques such as GPC. Suitable polyols for use in the pre-polymer are typically selected from the group of conventional polyols, such as polyether polyols, polyester polyols, polyether/ester polyols, and combinations thereof.

The one or more polyols may each independently be polyether polyols, polyester polyols, polyether/ester polyols, and combinations thereof. The one or more polyols may each independently have a number average molecular weight of from about 400 to about 15,000, alternatively from about 450 to about 7,000, and alternatively from about 600 to about 5,000, g/mol. In another embodiment, each of the one or more polyols independently has a hydroxyl number of from about 20 to about 1000, alternatively from about 30 to about 800, alternatively from about 40 to about 600, alternatively from about 50 to about 500, alternatively from about 55 to about 450, alternatively from about 60 to about 400, alternatively from about 65 to about 300, mg KOH/g.

In various embodiments, the polyol is chosen from conventional polyols, including, but not limited to, biopolyols, such as soybean oil, castor-oil, soy-protein, rapeseed oil, etc., derivatives thereof, and combinations thereof. Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyol copolymers include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

Specific isocyanates that may be included in the isocyanate component for preparing the isocyanate prepolymer include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl-diisocyanate; 2,4,6-toluylene triisocyanate; 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polyurethane elastomer compositions can also be prepared from aromatic diisocyanates or isocyanates having one or two aryl, alkyl, arakyl or alkoxy substituents wherein at least one of these substituents has at least two carbon atoms.

The isocyanate component typically has an NCO content of from 3 to 50, alternatively from 3 to 33, alternatively from 18 to 30, weight percent when tested in accordance with DIN EN ISO 11909, and a viscosity at 25° C. of from 5 to 2000, alternatively from 100 to 1000, alternatively from 150 to 250, alternatively from 180 to 220, mPa·sec when tested in accordance with DIN EN ISO 3219.

In various embodiments the isocyanate component is, includes, consists essentially of, or consists of, monomeric and polymeric isocyanate. For example, in one embodiment the isocyanate component includes polymeric diphenylmethane diisocyanate and 4,4'-diphenylmethane diisocyanate, and has an NCO content of about 30 to 33.5 weight percent. Alternatively, in another embodiment, the isocyanate component includes polymeric diphenylmethane diisocyanate and 4,4'-diphenylmethane diisocyanate, and has an NCO content of about 31.3 weight percent.

The isocyanate component is typically reacted to form the hydrolytically resistant polyurethane elastomer composition in an amount of from 10 to 90, alternatively from 20 to 75, alternatively from 30 to 60, percent by weight based on the total weight of all components used to form the polyurethane elastomer composition. The amount of the aliphatic isocyanate component reacted to form the hydrolytically resistant polyurethane elastomer composition may vary outside of the ranges above, but is typically both whole and fractional values within these ranges. Further, it is to be appreciated that more than one isocyanate may be included in the isocyanate component, in which case the total amount of all isocyanates included is within the above ranges.

Referring now to the isocyanate-reactive component, this component may be, include, consist essentially of, or consist of, a polydiene polyol.

The polydiene polyol comprises polymerized diene units. For purposes of the subject invention, the term "diene units" is used to describe units within a polymer which were formed from a diene or diolefin, i.e., a hydrocarbon having two carbon-carbon double bonds. Examples of dienes which can be used to from the polydiene include, but are not limited to, 1,2-propadiene, isoprene, and 1,3-butadiene.

In one embodiment, the polydiene polyol is a polybutadiene polyol, i.e., is formed from 1,3-butadiene and thus comprises butadiene units. Of course, 1,3-butadiene can polymerize to form 1,4-cis units, 1,4-trans units, and 1,2-vinyl units. The polybutadiene polyol may include, no less than 10, alternatively no less than 15, alternatively no less than 20, alternatively no less than 25, alternatively no less than 30, alternatively no less than 35, alternatively no less than 40, alternatively no less than 45, alternatively no less than 50, alternatively no less than 55, alternatively no less than 60, alternatively no less than 65, percent by weight 1,2-vinyl units based the total weight of the polybutadiene polyol. It is believed that the structure of the polybutadiene polyol imparts hydrolytic stability to the hydrolytically resistant layer (20). It is also believed that the structure of the polybutadiene polyol imparts hydrophobicity to the hydrolytically resistant layer (20).

The polydiene polyol typically has an average hydroxy functionality no greater than about 3, alternatively from about 2 to about 3, alternatively about 2. The polybutadiene polyol may include an average hydroxy functionality of no greater than 3, alternatively no greater than 2.7, alternatively no greater than 2.6, alternatively no greater than 2.5, alternatively greater than 2.4, alternatively no greater than 2.3, alternatively no greater than 2.1, alternatively no greater than 2.0. In one embodiment, the polydiene polyol is terminated with hydroxyl groups. In another embodiment, the polydiene polyol is terminated at both ends with hydroxyl groups. In another embodiment, the polydiene polyol is a hydroxy-terminated polybutadiene, i.e., is a linear polybutadiene having two primary hydroxy functional groups. In another embodiment, the hydroxy-terminated polybutadiene is terminated at each end with a hydroxy functional group.

The polydiene polyol typically has a number average molecular weight of from about 1000 to less than about 3000, alternatively from about 1000 to less than about 2200, alternatively from 1100 to 2000, alternatively from 1200 to 1800, alternatively from 1300 to 1700, alternatively from 1400 to 1600, g/mol, and a viscosity at 30° C. of from 0.5 to 6.0, alternatively from 0.5 to 2.5, alternatively from 0.7 to 2.3, alternatively from 0.8 to 2.1, alternatively from 0.9 to 1.9, Pa·sec when tested in accordance with DIN EN ISO 3219, as modified for a viscosity measurement at 30° C.

Suitable polydiene polyols are commercially available from TOTAL of Houston, Tex. under the trade names Poly bd® or Krasol®.

In an exemplary embodiment, the polydiene polyol is a hydroxy-terminated polybutadiene having about 20 percent by weight 1,2-vinyl units, a molecular weight of about 1200 to 1350 g/mol, and a viscosity at 30° C. of about 0.9 to 1.9 Pa·sec. In another exemplary embodiment, the polydiene polyol is a hydroxy-terminated polybutadiene having about 20 percent by weight 1,2-vinyl units, a molecular weight of about 1200 g/mol, and a viscosity at 30° C. of about 1.4 Pa·sec. In still another exemplary embodiment, the polydiene polyol is a hydroxy-terminated polybutadiene having about 20 percent by weight 1,2-vinyl units, a molecular weight of about 1350 g/mol, and a viscosity at 30° C. of about 1.4 Pa·sec. It is believed that because of the concentration of 1,2-vinyl units, i.e., olefinic double bonds, and low molecular weight, the hydroxy-terminated polybutadiene of this embodiment is a liquid at room temperature. The liquid is typically clear and water-white. The liquid form facilitates the formation of a consistent and uniform polyurethane elastomeric composition coating on the subsea structures. Further, the polybutadiene polyol imparts hydrolytic stability, low moisture permeability and/or low temperature flexibility to the polyurethane elastomeric composition. Alternatively, a polydiene polyol that is a hydroxy-terminated polybutadiene having about 20 percent by weight 1,2-vinyl units, a molecular weight of about 2800 g/mol, and a viscosity at 30° C. of about 5 Pa·sec may be used.

The polydiene polyol is typically present in the isocyanate-reactive component in an amount of from greater than 0 and less than 95 parts by weight based on 100 parts by weight of said isocyanate-reactive component, alternatively from 10 to 95, alternatively from 30 to 90, alternatively from 50 to 90, alternatively from 60 to 90, alternatively from 60 to 80, parts by weight based on 100 parts by weight of the isocyanate-reactive component. The amount of polydiene polyol may vary outside of the ranges above, but may be both whole and fractional values within these ranges. Further, it is to be appreciated that more than one polydiene polyol may be included in the isocyanate-reactive component, in which case the total amount of all polydiene polyol included is within the above ranges.

In addition to the polydiene polyol, the isocyanate-reactive component may also include one or more supplemental polyols. If included, the supplemental polyol is typically selected from the group of conventional polyols which are not polydiene polyols, such as polyether polyols, polyester polyols, polyether/ester polyols, and combinations thereof In one embodiment, the supplemental polyol has a water content below 0.05 percent by weight based on the total weight of the polyol. In additional embodiments, the supplemental polyol has a total sodium (Na) and potassium (K) contents less than about 15, alternatively less than about 10, alternatively less than about 5 ppm. In one embodiment, the isocyanate-reactive component may also comprise a polyether polyol having a higher average hydroxy functionality, e.g., greater than about 3. In another embodiment, the polyether polyol and the polydiene polyol together have an average hydroxy functionality of no greater than about 3, alternatively from about 2 to about 3, alternatively about 2. The polyether polyol and polybutadiene polyol together may include an average hydroxy functionality of no greater than 3, alternatively no greater than 2.7, alternatively no greater than 2.6, alternatively no greater than 2.5, alternatively greater than 2.4, alternatively no greater than 2.3, alternatively no greater than 2.1, alternatively no greater than 1.9, alternatively no greater than 1.7.

Suitable polyether polyols for use as the supplemental polyol include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2, 6-hexanetriol, pentaerythritol, and combinations thereof.

Other suitable polyether polyols for use as the supplemental polyol are polyether polyol copolymers that include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols for use as the supplemental polyol include, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols for use as the supplemental polyol may be obtained by the inclusion of aminoalcohols such as ethanolamine in polyesterification mixtures. Suitable polythioether polyols for use as the supplemental polyol include products obtained by condensing thiodiglycol either alone or with other glycols, alkylene oxides, dicarboxylic acids, formaldehyde, aminoalcohols or aminocarboxylic acids. Suitable polycarbonate polyols for use as the supplemental polyol include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols for use as the supplemental polyol include those prepared by reacting glycols such as diethylene glycol, triethylene glycol or hexanediol with formaldehyde. Other suitable polyacetal polyols for use as the supplemental polyol may also be prepared by polymerizing cyclic acetals. Suitable polyolefin polyols for use as the supplemental polyol include hydroxy-terminated butadiene homo- and copolymers and suitable polysiloxane polyols include polydimethylsiloxane diols and triols.

Other suitable supplemental polyols include, but are not limited to, biopolyols, such as soybean oil, castor-oil, soy-protein, rapeseed oil, etc., and derivatives and combinations thereof.

In addition, lower molecular weight hydroxyl-functional compounds may also be utilized such as ethylene glycol, diethylene glycol, propylene glycol, dipropylene glycol, butane diol, glycerol, trimethylpropane, triethanolamine, pentaerythritol, sorbitol, and combinations thereof The supplemental polyol may be included in the isocyanate-reactive component in an amount of from 1 to 70, alternatively from 5 to 50, alternatively 5 to 25, percent by weight based on the total weight of all components included in the isocyanate-reactive component. The amount of supplemental polyol may vary outside of the ranges above, but may be both whole and fractional values within these ranges. Further, it is to be appreciated that more than one supplemental polyol may be included in the isocyanate-reactive component, in which case the total amount of all supplemental polyol included is within the above ranges. Particularly suitable supplemental polyols are commercially available from BASF Corporation of Wyandotte, Mich., under the trade name of Pluracol®. In a preferred embodiment, the supplemental polyol is a polyether polyol available from BASF Corporation of Wyandotte, Mich. under the trade name Pluracol® 2010.

In another embodiment, the supplemental polyol has a number average molecular weight of from about 400 to about 15,000, alternatively from about 450 to about 7,000, and alternatively from about 600 to about 5,000, g/mol. In another embodiment, the supplemental polyol has a hydroxyl number of from about 20 to about 1000, alternatively from about 30 to about 800, alternatively from about 40 to about 600, alternatively from about 50 to about 500, alternatively from about 55 to about 450, alternatively from about 60 to about 400, alternatively from about 65 to about 300, mg KOH/g. In yet another embodiment, the supplemental polyol has a nominal hydroxy functionality of from about 2 to about 4, alternatively from about 2.2 to about 3.7, and alternatively of from about 2.5 to about 3.5.

In addition to the polydiene polyol, the isocyanate-reactive component may also include one or more chain extenders and/or crosslinkers (hereinafter collectively referred to as chain extenders. The chain extender has at least two hydroxyl functional groups and a number average molecular weight of no more than 400 g/mol. Specifically, the chain extender typically has a nominal functionality no greater than 4, alternatively no greater than 3, alternatively no greater than 2.5, alternatively from 1.9 to 3.1, alternatively from 1.9 to 2.5, and a number average molecular weight of from 50 to 400, alternatively from 60 to 300, alternatively from 62 to 220, alternatively from 70 to 220, alternatively from 75 to 195, alternatively about 192, alternatively about 134, alternatively about 76.

Non-limiting examples of such chain extenders include, but are not limited to, straight chain glycols having from 2 to 20 carbon atoms in the main chain, diols having an aromatic ring and having up to 20 carbon atoms, and even triols such as those set forth below. Examples of suitable chain extenders, for purposes of the present invention, include propylene glycol, dipropylene glycol, tripropylene glycol, di ethylene glycol, 1,3-propanediol, 1,4-butanediol, 1,5-pentanediol, 1,6-hexanediol, 2-butene-1,4-diol, thoidiethanol, butyleneglycol, 1,4-bis(hydroxyethoxy)benzene, p-xylene glycol and hydrogenated products thereof, trimethylol, stearyl alcohol, N,N-diisopropanol aniline, 2-ethyl-1,3-hexanediol, 2-butyl-2-ethyl-1,3-propanediol, 2,2,4-trimethyl-1,3-pentanediol, and hydroxyethyl acrylate. In one embodiment, the chain extender may comprise an alkylene glycol. In one specific embodiment, the alkylene glycol is selected from the group of propylene glycol, dipropylene glycol, tripropylene glycol, and combinations thereof In another embodiment, the chain extender is dipropylene glycol. It is believed that the chain extender imparts an even increased hydrolytic resistance, as well as increased strength, tear strength, and hardness to the polyurethane elastomeric composition as a result of its lower molecular weight and its molecular structure, e.g., ether groups.

In one embodiment, the isocyanate-reactive component consists essentially of the chain extender comprising the polydiene polyol and an alkylene glycol. In this and additional embodiments, the chain extender may present in the isocyanate-reactive component in an amount of more than about 5, alternatively more than about 10, alternatively more than about 15, alternatively more than about 20 parts by weight based on 100 parts by weight of all the components included in the isocyanate-reactive component. In other embodiments, the chain extender may present in the isocyanate-reactive component in an amount of less than about 30, alternatively less than about 25, alternatively less than about 20, parts by weight based on 100 parts by weight of all the components included in the isocyanate-reactive component. In another embodiment, the isocyanate-reactive component consists essentially of the chain extender comprising an alkylene glycol, the polydiene polyol, and a polyether supplemental polyol. The amount of chain extender may vary outside of the ranges above, but may be both whole and fractional values within these ranges. Further, it is to be appreciated that more than one chain extender may be included in the isocyanate-reactive component, in which case the total amount of all chain extender included is within the above ranges.

In addition to the polydiene polyol, the isocyanate-reactive component may also include one or more amines. Any amine known in the art may be utilized. For example, the amine may be chosen from MDA, TDA, ethylene-, propylene- butylene-, pentane-, hexane-, octane-, decane-, dodecane-, tetradecane-, hexadecane-, octadecanediamines, Jeffamines-200, -400, -2000, -5000, hindered secondary amines like Unilink 4200, Curene 442, Polacure 740, Ethacure 300, Lonzacure M-CDEA, Polyaspartics, 4,9 Dioxadodecan-1,12-diamine, and combinations thereof In other embodiments, the amine is chosen from Lupragen® API-N-(3-Aminopropyl)imidazole, Lupragen® DMI-1,2-Dimethylimidazole, Lupragen® DMI-1,2-Dimethylimidazole, Lupragen® N 100-N,N-Dimethylcyclohexylamine, Lupragen® N 101-Dimethylethanolamine, Lupragen® N 103-N,N-Dimethylbenzylamine, Lupragen® N 104-N-Ethylmorpholine, Lupragen® N 105-N-Methylmorpholine, Lupragen® N 106-2,2'-Dimorpholinodiethylether, Lupragen® N 107-Dimethylaminoethoxyethanol, Lupragen® N 201-TEDA in DPG, Lupragen® N 202-TEDA in BDO, Lupragen® N 203-TEDA in MEG, Lupragen® N 204-N,N'-Dimethylpiperazine, Lupragen® N 205-Bis(2-dimethylaminoethyl)ether, Lupragen® N 206-Bis(2-dimethylaminoethyl)ether, Lupragen® N 301-Pentamethyldiethylenetriamine, Lupragen® N 301-Pentamethyldiethylenetriamine, Lupragen® N 400-Trimethylaminoethylethanolamine, Lupragen® N 500-Tetramethyl-1,6-hexandiamine, Lupragen® N 500-Tetramethyl-1,6-hexanediamine, Lupragen® N 600-S-Triazine, Lupragen® N 700-1,8-Diazabicyclo-5,4,0-undecene-7, Lupragen® NMI-N-Methylimidazole, and combinations thereof The isocyanate-reactive component may also include one or more catalysts. The catalyst is typically present in the isocyanate-reactive component to catalyze the reaction between the isocyanate component and the isocyanate-reactive component. That is, isocyanate-reactive component typically includes a "polyurethane catalyst" which catalyzes the reaction between an isocyanate and a hydroxy functional group of the isocyanate reactive group, including a hydroxy group from the polydiene polyol. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., organo-tin compounds, organo-bismuth compounds, organo-lead compounds, etc.

This catalyst may be any in the art. In one embodiment, the isocyanate catalyst is an amine catalyst. In another embodiment, the isocyanate catalyst is an organometallic catalyst.

The isocyanate catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the isocyanate catalyst is or includes dibutyltin dilaurate, which is a dialkyltin(IV) salt of an organic carboxylic acid. Specific examples of non-limiting isocyanate catalysts are commercially available from Air Products and Chemicals, Inc. of Allentown, Pa., under the trademark DABCO®. The isocyanate catalyst can also include other dialkyltin(IV) salts of organic carboxylic acids, such as dibutyltin diacetate, dibutyltin maleate and dioctyltin diacetate.

Examples of other suitable but non-limiting isocyanate catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting isocyanate catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting isocyanate catalysts include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethylethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof In various embodiments, the isocyanate catalyst is commercially available from Air Products and Chemicals, Inc. under the trademark POLYCAT. The isocyanate catalyst may include any combination of one or more of the aforementioned catalysts.

In still other embodiments, the catalyst is chosen from DABCO TMR, DABCO TMR-2, DABCO HE, DABCO 8154, PC CAT DBU TA 1, PC CAT Q1, Polycat SA-1, Polycat SA-102, salted forms, and/or combinations thereof.

In other embodiments, the catalyst is chosen from dibutyltin dilaurate, dibutyltin oxide (e.g. as a liquid solution in C8-C10 phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethyltin bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyitin maleate, dibutyltin mercaptopropionate, dibutyltin bis (isoodyithioglycolate), dibutyltin diacetate, dioctyltin oxide mixture, dioctyltin oxide, dibutyltin diisooctoate, dibutyltin dineodecanoate, dibutyltin carboxylate, dioctyitin carboxylate, and combinations thereof.

The isocyanate catalyst can be utilized in various amounts. For example, in various embodiments, the isocyanate catalyst is utilized in an amount of from 0.0001 to 10, from 0.0001 to 5, from 5 to 10, weight percent based on a total weight percent of reactants or the isocyanate or any other value or range of values therebetween. Typically, an amount of catalyst used depends on a temperature of the process. For example, at 150° F. (about 65.5° C.), 0.0001% may be utilized, while at room temperature 0.001 to 10% , such as 5-10%, such as 0.001 to 1%, may be utilized.

The isocyanate-reactive component can also include a "curing agent", i.e., a crosslinker that crosslinks the carbon-carbon double bonds of the polydiene polyol. Examples of curing agents include, but are not limited to, organic peroxides, sulfur, and organic sulfur-containing compounds. Non-limiting examples of organic peroxides include dicumyl peroxide and t-butylperoxyisopropyl benzene. Non-limiting examples of organic sulfur-containing compounds include thiuram based vulcanization promoters such as tetramethylthiuram disulfide (TMTD), tetraethylthiuram disulfide (TETD), and dipentamethylenethiuram tetrasulfide (DPTT), 4,4'-dithiomorpholine.

The isocyanate-reactive component can also include an adhesion promoter. The adhesion promoter may be a silicon-containing adhesion promoter. Adhesion promoters are also commonly referred to in the art as coupling agents or binder agents. The adhesion promoter facilitates binding the polyurethane elastomeric coating composition to a subsea structure.

The isocyanate-reactive component can also include a wetting agent. The wetting agent may be a surfactant. The wetting agent may include any suitable wetting agent or mixtures of wetting agents known in the art. The wetting agent is employed to increase a surface area contact between the polyurethane elastomeric composition and the subsea structure.

The isocyanate-reactive component may also include various additional additives. Suitable additives include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, amines, transition metals, and combinations thereof. The additive may be included in any amount as desired by those of skill in the art.

For example, a pigment additive allows the polyurethane elastomeric composition to be visually evaluated for thickness and integrity and can provide various marketing advantages.

The hydrolytically resistant layer (20) is not limited to any particular dimensions or thickness. In various embodiments, the hydrolytically resistant layer (20) has a thickness of from 0.010 to 12, from 0.010 to 6, from 0.010 to 1, from 0.010 to 0.5, from 0.025 to 0.5, from 0.050 to 0.5, from 0.025 to 0.1, from 0.025 to 0.05, from 0.05 to 0.1, from 0.05 to 0.5, from 1 to 12, from 2 to 11, from 3 to 10, from 4 to 9, from 5 to 7, from 5 to 6, from 3 to 6, or from 6 to 12 inches (with 1 inch equal to about 2.54 cm) In various non-limiting embodiments, all values and ranges of values between the aforementioned values are hereby expressly contemplated.

The polyurethane elastomer composition for forming the layer (20) may be provided in a system including the isocyanate component and the isocyanate-reactive component. The system may be provided in two or more discrete components, such as the isocyanate component and the isocyanate-reactive (or resin) component, i.e., as a two-component (or 2K) system, which is described further below. It is to be appreciated that reference to the isocyanate component and the isocyanate-reactive component, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other.

The hydrolytically resistant layer (20) and corresponding composition is formed from reacting the isocyanate component and the isocyanate-reactive component. Once formed, the hydrolytically resistant layer (20) and/or polyurethane elastomer composition is chemically and physically stable over a range of temperatures and does not typically decompose or degrade when exposed to higher pressures and temperatures, e.g., pressures and temperatures greater than pressures and temperatures typically found on the earth's surface. As one example, the hydrolytically resistant polyurethane elastomer composition is particularly applicable when the composition is used as a layer (20) for a subsea structure (26) and is exposed to cold seawater having a temperature of freezing or above, e.g. about 2 to 5° C., particularly about 4° C., and significant pressure and hot oil temperatures of up to about 150° C., such as about 120 to 150° C., particularly about 130 to 140° C. The hydrolytically resistant polyurethane elastomer composition is generally viscous to solid nature, and depending on molecular weight.

The polyurethane elastomer composition and/or hydrolytically resistant layer (20) may exhibit excellent non-wettability in the presence of water, freshwater or seawater, as measured in accordance with standard contact angle measurement methods known in the art. The hydrolytically resistant layer (20) may have a contact angle of greater than 90° and may be categorized as hydrophobic. Further, the hydrolytically resistant layer (20) typically exhibits excellent hydrolytic resistance and will not lose strength and durability when exposed to water. The polyurethane elastomer composition can be cured/cross-linked to form the hydrolytically resistant layer (20) prior to disposing the subsea structure (26) into the ocean.

The hydrolytically resistant layer (20) may also exhibit excellent underwater thermal stability for high temperature and pressure applications. The hydrolytically resistant layer (20) may be stable at temperatures greater than 100, such as 102° C. The thermal stability of the hydrolytically resistant layer (20) is typically determined by thermal gravimetric analysis (TGA).

Method of Forming the Composite Article (10):

This disclosure also provides a method of forming the composite article (10). The method includes the steps of providing the first layer (14), providing the at least one acrylate and the organoborane initiator, providing the epoxide composition, providing the polyurethane composition, disposing the at least one acrylate and the organoborane initiator on the first layer (14), polymerizing the at least one acrylate in the presence of the organoborane initiator to form the poly(meth)acrylate layer (16) that includes a poly(meth)acrylate and that is disposed on and in direct contact with the first layer (14), disposing the epoxide composition on the poly(meth)acrylate layer (16), curing the epoxide composition to form the epoxide layer (18) that includes the epoxide and that is disposed on and in direct contact with the poly(meth)acrylate layer (16), disposing the hydrolytically resistant polyurethane composition on the epoxide layer (18), and curing the hydrolytically resistant polyurethane elastomer composition to form the hydrolytically resistant layer (20) that includes the hydrolytically resistant polyurethane elastomer and that is disposed on an in direct contact with the epoxide layer (18).

Any one or more of the aforementioned steps of providing may be any known in the art. For example, any one or more of the compositions may be provided or supplied in individual components and/or as combinations of one or more components. Any one or more of the steps of disposing may be further defined as applying, spraying, pouring, placing, brushing, or coating, etc. The components of any one or more of the compositions may be disposed with, or independently from, any one or more other components. In one embodiment, the step of providing the first layer (14) is further defined as providing the first layer (14) that is already disposed on a pipe (12). In such an embodiment, the first layer (14) can be used "in-situ" to form the multilayer coating (28) directly on the pipe (12). Alternatively, the step of providing the first layer (14) may be further defined as providing the first layer (14) independently from the pipe (12). In other words, the first layer (14) may be provided and used independently from the pipe (12). In fact, the pipe (12) is not at all required in the method. The first layer (14) may be provided and used to form any of the embodiments of the multilayer coating (28) and/or composite article (10).

For example, the hydrolytically resistant polyurethane elastomer composition for forming the layer (20) may itself be formed by providing the isocyanate component, providing the isocyanate-reactive component and reacting the isocyanate component and the isocyanate-reactive component. The method may further include heating the isocyanate component and the isocyanate-reactive component. Alternatively, the method may include the step of combining the isocyanate component and the isocyanate-reactive component to form a reaction mixture, and applying the reaction mixture to form the layer (20). The method may include spraying the reaction mixture.

The isocyanate-reactive component is not required to be formed prior to the step of applying. For example, the isocyanate component and the isocyanate-reactive component may be combined to form the reaction mixture simultaneous with the step of disposing or applying. Alternatively, the isocyanate component and the isocyanate-reactive component may be combined prior to the step of applying.

The individual components of any of the aforementioned compositions may be contacted in a spray device. The spray device may include a hose and container compartments. The components may then be sprayed. The poly(meth)acrylate and/or epoxide may be fully reacted upon spraying. The components may be separate immediately before they are contacted at a nozzle of the spray device. The components may then be together sprayed, e.g. onto the subsea structure (26). Spraying typically results in a uniform, complete, and defect-free layer. For example, the kayer is typically even and unbroken. The layer also typically has adequate thickness and acceptable integrity. Spraying also typically results in a thinner and more consistent layer as compared to other techniques. Spraying permits a continuous manufacturing process. Spray temperature is typically selected by one known in the art.

Figure 1:
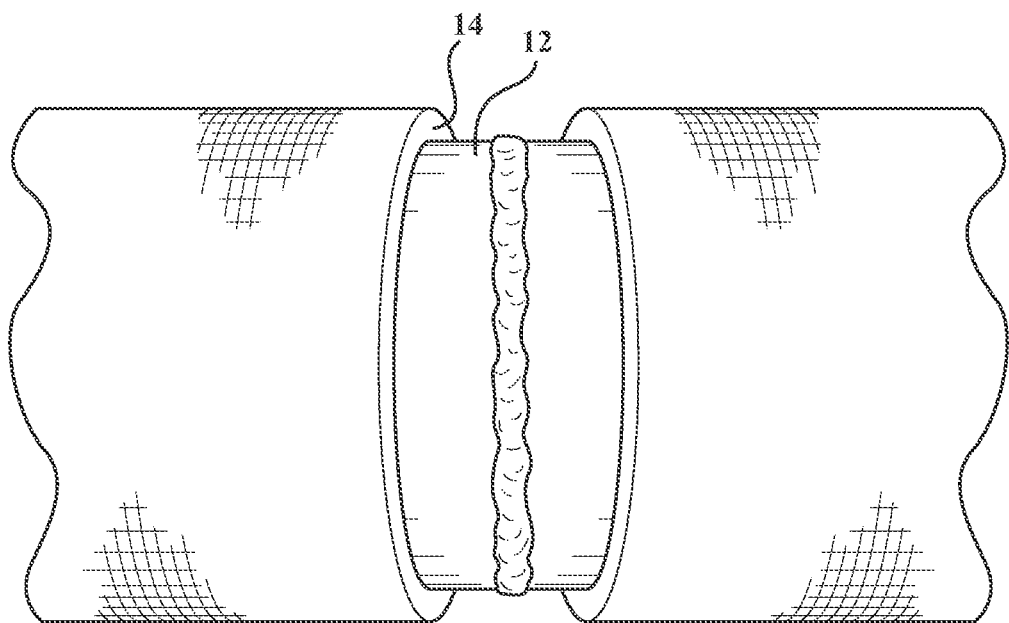
FIG. 1 is a perspective view of a subsea pipe that includes a first layer including a low surface energy polymer.
Figure 2:
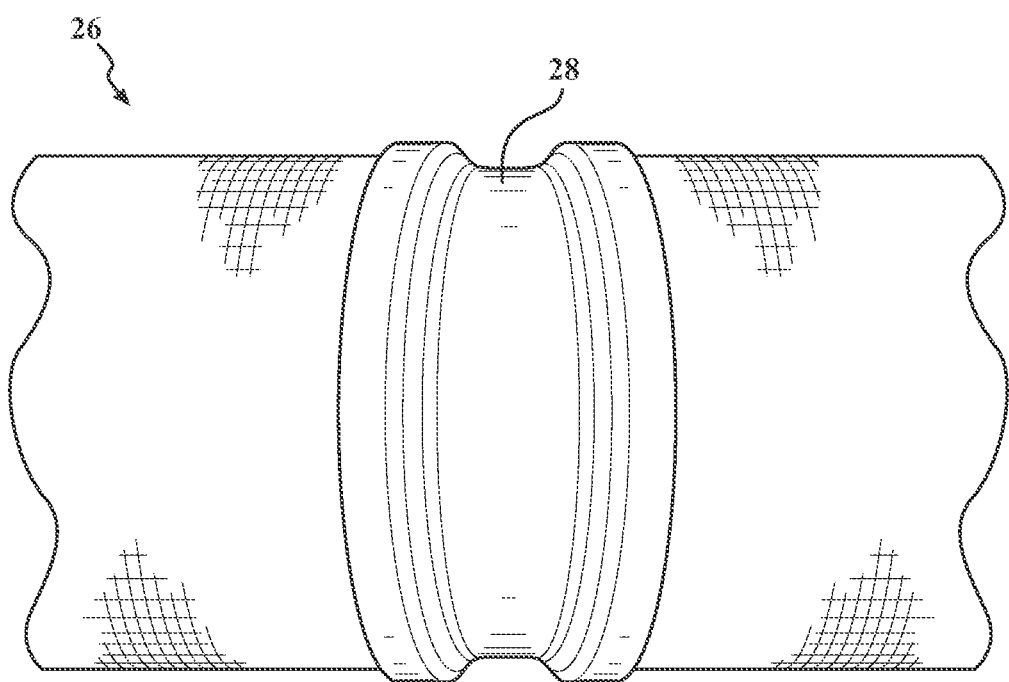
FIG. 2 is a perspective view of a subsea structure that includes one embodiment of the multilayer coating of this disclosure.

Subsea Structure:

The composite article (10) may be further defined as a patch, film, covering, multilayer film or layer, etc, e.g. as shown in FIG. 2. In various embodiments, the composite article (10) is used as a patch on/in a subsea structure (26) such as a structure for use during offshore oil and gas exploration endeavors, as shown, e.g. in FIG. 1.

This disclosure provides a subsea structure (26) including a pipe (12) having a length, a first layer (14) disposed on the pipe (12) and including the low surface energy polymer, and a multilayer coating (28) disposed on and in direct contact with the first layer (14). The pipe (12) is not limited in composition and may be or include metal, polymers, or combinations thereof. The multilayer coating (28) includes the poly(meth)acrylate layer (16) disposed on and in direct contact with the first layer (14), the epoxide layer (18) disposed on and in direct contact with the poly(meth)acrylate layer (16), and the hydrolytically resistant layer (20) disposed on and in direct contact with the epoxide layer (18), wherein the multilayer coating (28) has a peel strength of at least 50 pli measured between the hydrolytically resistant layer (20) and the epoxide layer (18) using ASTM D6862. In one embodiment, the first layer (14) includes a first section and a second section, wherein the first section is spaced apart from the second section along the length of the pipe (12) and the multilayer coating (28) is disposed between said first and second sections, e.g. as shown in FIG. 2.

Non-limiting examples of suitable subsea structures (26) include pipes (12), flowlines, pipelines, manifolds, pipeline end terminators, pipeline end manifolds, risers, field joints, other joints, jumpers, pipe pigs, bend restrictors, bend stiffeners or christmas trees. A christmas tree is a type of structure well known in the offshore oil and gas exploration field. It is to be appreciated that other structures not described herein may also be suitable for the purposes of the present disclosure. The subsea structure (26) may be a pipe (12) having a diameter of about 12 to about 18 inch diameter (wherein a 12 inch diameter is about a 30.48 cm diameter and wherein an 18 inch diameter is about a 45.72 cm diameter). The diameter of a subsea pipe (12) structure is not limited, and may range from a few inches (i.e., a few centimeters), in the case of a flowline, to several feet (several meters). The length of the pipe (12) is also not limited. In various embodiments, a multilayer coating (28) is utilized in the subsea structure (26) wherein the multilayer coating (28) is, consists of, or consists essentially of, the poly(meth)acrylate layer (16), the epoxide layer (18), and the hydrolytically resistant layer (20). For example, the first layer (14) may be disposed on the pipe (12) and the multilayer coating (28) may be formed using the first layer (14) that is already disposed on the pipe (12). Alternatively, the multilayer coating (28) may be formed using the first layer (14) when the first layer (14) is not disposed on the pipe (12) such that the multilayer coating (28) may then be later disposed on the pipe (12).

In various embodiments, the multilayer coating (28) insulates a portion of the subsea structure (26). For example, the multilayer coating (28) may form an exterior partial or full coating having a thickness on the structure intended for subsea applications. The thickness of the multilayer coating (28) may be half an inch thick (about 1.27 cm thick). Alternatively, the thickness of the multilayer coating (28) may be one foot thick (about 30.48 cm thick). In one embodiment, the thickness of the hydrolytically resistant layer (20) may be about four inches (about 10.16 cm). In another embodiment, the thickness of the hydrolytically resistant layer (20) may be about six inches (about 15.24 cm). In yet another embodiment, the thickness of the hydrolytically resistant layer (20) may be about nine inches (about 22.86 cm).

In addition, the multilayer coating (28) may insulate petroleum fuels, such as oil and/or gas, that flows through the subsea structure (26). The multilayer coating (28) may coat a large enough surface area of a subsea structure (26) so that the multilayer coating (28) can effectively insulate the subsea structure (26) and the petroleum fuels, such as oil, flowing within the subsea structure (26). When the petroleum fuel, such as oil, is collected from about one to two miles beneath the ocean floor, the oil is very hot (e.g., around 130° C.). Seawater at this depth is very cold (e.g., around 4° C.). The multilayer coating (28) may insulate the oil during transportation from beneath the ocean floor to above the surface of the ocean. The multilayer coating (28) can insulate the oil so that the vast difference in average seawater temperature and average oil temperature does not substantially affect the integrity of the oil. The multilayer coating (28) typically maintains a relatively high temperature of the petroleum fuels such that the fuels, such as oil, can easily flow through the subsea structures (26), such as pipes (12) and pipelines. The multilayer coating (28) typically adequately prevents the fuel (oil) from becoming too cold, and therefore too viscous to flow, due to the temperature of the seawater. The multilayer coating (28) also typically adequately prevents the oil from forming waxes that detrimentally act to clog the subsea structures (26) and/or from forming hydrates that detrimentally change the nature of the oil and also act to clog the subsea structures (26). The multilayer coating (28) may be flexible to enable the subsea structure (26) to be manipulated in different ways. For instance, the subsea structure (26) of this disclosure, such as a pipeline, may be dropped off the edge of an oil platform, rig or ship, and maneuvered, by machine or otherwise, through the ocean and into the ocean floor. Also, if any one of the subsea structures (26) is made of an expandable material, such as a metallic material, it may expand due to any one of several factors, including heat. The flexibility of the multilayer coating (28) typically allows for the expansion, due to, for instance, heat, without becoming delaminated itself. That is, the multilayer coating (28) can stretch with the expanding subsea structure (26) without deteriorating or delaminating itself. It is to be appreciated that the multilayer coating (28) can also have applications beyond offshore oil and gas exploration, including, but not limited to, any type of underwater, including fresh water and seawater, applications.

Any one or more of the layers may be formed in-situ on the subsea structure (26). The components of any one or more of the layers may be combined at the time of disposing the components onto the subsea structure (26).

EXAMPLE

The example herein compares a polyurethane elastomer formed in accordance with the present invention to a formulation not formed in accordance with the present invention for resistance to hydrolysis in hot salt water.

The elastomeric sample plaques were produced using a "book mold," which is an aluminum mold that has a top and bottom and which is hinged on one side and is open on the opposing side. The elastomeric sample plaques created for evaluation were approximately 0.3175 cm thick, 25.4 cm wide and 25.4 cm long (i.e., ⅛ inch thick, 10 inches long and 10 inches wide).

For each of the elastomeric plaques the isocyanate-reactive components were weighed into a Hauschild Speedmixer cup and then blended using the Hauschild Speedmixer (2200 rpm, 30 seconds). Dissolved gasses in the polyol blend and the isocyanate were removed under vacuum. The required amount of isocyanate was then poured into the Speedmixer cup and the mixture blended using the Speedmixer for about 40 seconds. The reaction mixture was then poured into an angled, aluminum, oven-heated book mold that was preheated to 80° C. The plaques (25.4 cm×25.4 cm×0.3175 cm) (i.e., 10 in.×10 in.×⅛ in.) were cured in-mold at 80° C. until cured sufficiently for demolding and then postcured for about 18 hours at 80° C. and then 160° C. for one hour.

Test sample coupons (type S2 tensile bars made according to DIN 53504) were die-cut from the postcured plaques. Initial tensile strength (DIN 53504, S2 sample type, crosshead speed, 200 mm/min; Gauge length: 38 mm) was determined after submersing the tensile bars in salt water for at least 1 month at room temperature. The initial tensile strength was used to calculate percent loss in tensile strength after exposure. To evaluate hydrolysis resistance, the tensile bars were submerged in hot synthetic sea water (ASTM D665) at 102° C. using an autoclave. This method is sometimes referred to as "hot/wet aging." Specimens were removed at predetermined times and tested (without drying) for tensile strength using the DIN 53504 S2 standard test method.

An example polyurethane formulation in accordance with the present invention is shown in Table 1 (formulation quantities are parts by weight). Also shown in Table 1 is Comparison 1, not made according to the invention. Example 1 contains peroxide and was postcured at 160 C for one hour to crosslink the elastomer, according to the present invention. Comparison 1 does not contain peroxide (but was also postcured at 160 C for one hour).

TABLE 1

Formulations for Example 1 and Comparison 1.

| components | Example 1 | Comparison 1 |
|---|---|---|
| | parts by weight | |
| Polyol 1 | 55.1 | 57.0 |
| Polyol 2 | 33.1 | 34.2 |
| Chain Extender | 7.3 | 7.5 |
| Peroxide | 3.4 | 0.0 |
| Drying Agent | 1.0 | 1.0 |
| Defoamer | 0.3 | 0.3 |
| Catalyst | 0.03 | 0.03 |
| Isocyanate | 38.6 | 39.9 |

Raw Materials for Table 1
  Polyol 1—Hydroxyl-terminated poly(butadiene) resin (MW 2800 g/mol, OH#: 47.1, Visc.: 8000 mPa·s (23° C.). Available from Cray Valley as Poly bd R45HTLO.
  Polyol 2—Hydrogenated Dimer Diol (OH# 206, MW 537 g/mol). Available from BASF as Sovermol 908.
  Chain Extender—2 ethyl-1,3-hexanediol, Sigma-Aldrich.
  Peroxide—dicumyl peroxide, Sigma-Aldrich.
  Catalyst—BiCat 8118 from Shepherd Chemical Company (10% in castor oil).
  Drying agent—Molsiv 3A, UOP.
  Defoamer—BYK 066N, Byk Chemie.
  Isocyanate: Polymeric MDI (PMDI) (% NCO=31.5, f=2.7, Viscosity=200 mPa·s at 77° F. (25° C.). Available from BASF as Lupranate M20.
  Synthetic sea water—ASTM D665 grade, Sigma-Aldrich.

Figure 4:
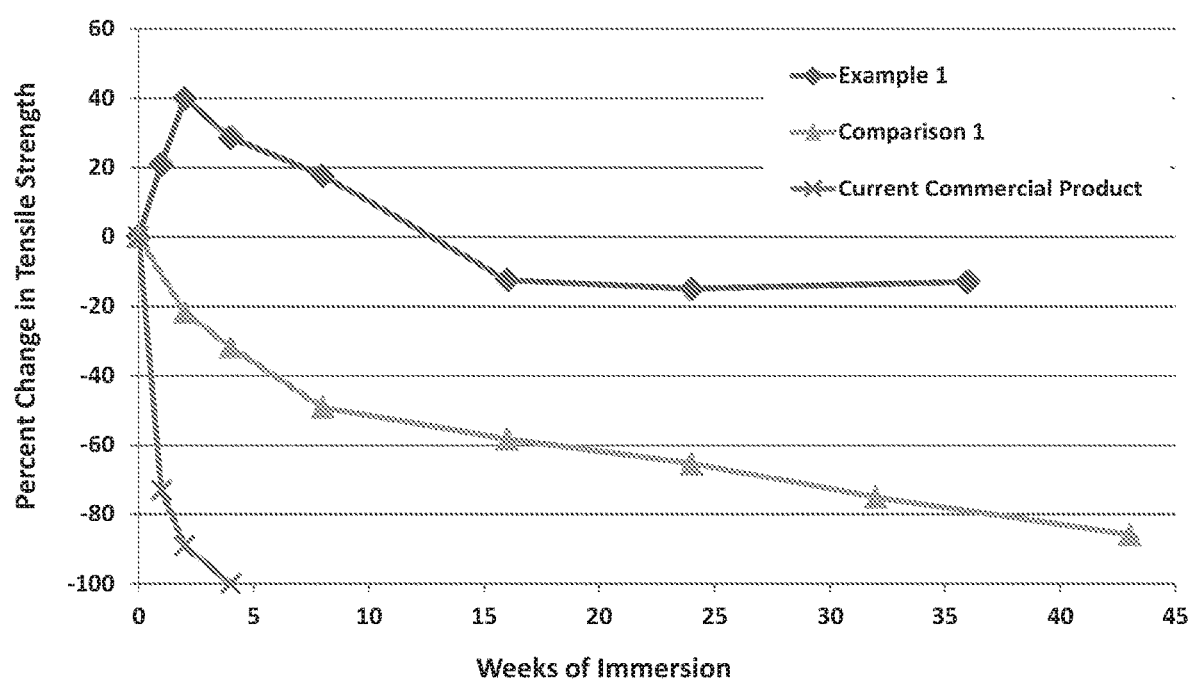
FIG. 4 is a graph comparing the change in tensile strength of elastomeric polyurethane plaques to the number of weeks of immersion.

The results of hot/wet immersion testing for the material in Table 1 are shown as plots of the percent change in tensile strength versus immersion time in FIG. 4. As shown in FIG. 4, Example 1 of the present invention lost 13% of its initial tensile strength after 36 weeks of immersion in synthetic sea water at 102° C. (after which time testing was stopped). By contrast, Comparison 1 lost 86% of its initial tensile strength after 43 weeks of immersion under the same conditions (after which time testing was stopped). For still further comparison, a commercial product used in subsea applications (Elastoshore 10060R/10002T; available from BASF Corporation of Florham Park, N.J.) was tested under the same conditions until decomposition (4 weeks) and the results were also included in FIG. 4.

These results from FIG. 4 clearly show the benefit of the present invention for resistance to hydrolysis in hot salt water. Peroxide crosslinking, as according to the invention, gives the polyurethane material the best ability to maintain physical properties (monitored via tensile strength in this example) during long-term immersion in hot salt water. This accelerated testing gives a good indication that polyurethane formulations according to the present invention will maintain important physical properties for much longer in real-world subsea applications in comparison to a non-crosslinked polyurethane formulation.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is to be understood that the term average hydroxy functionality is used when referring to a mixture of polymers, such as a mixture of a polyether polyol and a polydiene polyol.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A composite article comprising:
A. a first layer comprising a low surface energy polymer;
B. a poly(meth)acrylate layer disposed on and in direct contact with said first layer, wherein said poly(meth)acrylate layer comprises a poly(meth)acrylate comprising the reaction product of at least one acrylate polymerized in the presence of an organoborane initiator;
C. an epoxide layer disposed on and in direct contact with said poly(meth)acrylate layer, wherein said epoxide layer comprises an epoxide; and
D. a hydrolytically resistant layer disposed on and in direct contact with said epoxide layer, wherein said hydrolytically resistant layer has an initial tensile strength as measured in accordance with the DIN 53504 S2 standard test method and comprises a hydrolytically resistant polyurethane elastomer comprising the reaction product of:
   (1) an isocyanate component; and
   (2) an isocyanate-reactive component comprising a polydiene polyol having an average hydroxy functionality of no greater than about 3 and a number average molecular weight of from about 1000 to less than about 2000 g/mol;
   reacted in the presence of (3) a curing agent for crosslinking the carbon-carbon double bonds of the polydiene polyol,
   wherein said hydrolytically resistant layer retains at least 80% of said initial tensile strength as measured in accordance with the DIN 53504 S2 standard test method and after submersion in standardized seawater for 24 weeks at 102° C. in accordance with ASTM D665.

2. The composite article of claim 1 wherein said poly(meth)acrylate is covalently bonded to said low surface energy polymer.

3. The composite article of claim 1 wherein said low surface energy polymer is selected from polypropylene, polyethylene, and combinations thereof.

4. The composite article of claim 1 wherein said poly(meth)acrylate is a self-polymerization product of a C1-C20 alkyl acrylate or methacrylate.

5. The composite article of claims 1 wherein said poly(meth)acrylate is a reaction product of a first C1-C20 alkyl acrylate or methacrylate and a second C1-C20 alkyl acrylate or methacrylate.

6. The composite article of claim 1 wherein said poly(meth)acrylate is a reaction product of a first C1-C20 alkyl acrylate or methacrylate, a second C1-C20 alkyl acrylate or methacrylate, and a third C1-C20 alkyl acrylate or methacrylate.

7. The composite article of claim 1 wherein said epoxide is the reaction product of an epoxy compound and an amine.

8. The composite article of claims 1 wherein said organoborane initiator is further defined as an organoborane-organonitrogen complex.

9. The composite article of claims 1 wherein said organoborane initiator is an organoborane-amine complex and said at least one acrylate is polymerized in the presence of said organoborane-amine complex and an amine-reactive compound.

10. The composite article of claims 1 wherein said composite article has a peel strength of at least 50 pli measured between said hydrolytically resistant layer and said epoxide layer using ASTM D6862.

11. The composite article of claim 1 wherein said hydrolytically resistant layer retains at least 99% of said initial tensile strength as measured in accordance with the DIN 53504 S2 standard test method and after submersion in standardized seawater for 24 weeks at 102° C. in accordance with ASTM D665.

12. A method of forming the composite article claim 1, said method comprising the steps of providing the first layer of the low surface energy polymer; providing the at least one acrylate and the organoborane initiator; providing the epoxide; providing the isocyanate component and the isocyanate-reactive component; disposing the at least one acrylate and the organoborane initiator on the first layer; polymerizing the at least one acrylate in the presence of the organoborane initiator to form the poly(meth)acrylate layer; disposing the epoxide on the poly(meth)acrylate layer, curing the epoxide to form the epoxide layer; disposing the isocyanate component and the isocyanate-reactive component on the epoxide layer; and reacting the isocyanate component with the isocyanate-reactive component in the presence of the curing agent for crosslinking the carbon-carbon double bonds of the polydiene polyol to form the hydrolytically resistant layer and the multilayer coating.

13. A subsea structure comprising:
A. a pipe having a length;
B. a first layer disposed on said pipe and comprising a low surface energy polymer;
C. a multilayer coating disposed on and in direct contact with said first layer, wherein
said multilayer coating comprises:
(1) a poly(meth)acrylate layer disposed on and in direct contact with said first layer, wherein said poly(meth)acrylate layer comprises a poly(meth)acrylate comprising the reaction product of at least one acrylate polymerized in the presence of an organoborane initiator;
(2) an epoxide layer disposed on and in direct contact with said poly(meth)acrylate layer, wherein said epoxide layer comprises an epoxide; and
(3) a hydrolytically resistant layer disposed on and in direct contact with said epoxide layer, wherein said hydrolytically resistant layer has an initial tensile strength as measured in accordance with the DIN 53504 S2 standard test method and comprises a hydrolytically resistant polyurethane elastomer comprising the reaction product of:
(a) an isocyanate component; and
(b) an isocyanate-reactive component comprising a polydiene polyol having an average hydroxy functionality of no greater than about 3 and a number average molecular weight of from about 1000 to less than about 2000 g/mol; wherein said hydrolytically resistant layer retains at least 80% of said initial tensile strength as measured in accordance with the DIN 53504 S2 standard test method and after submersion in standardized seawater for 24 weeks at 102° C. in accordance with ASTM D665.

14. The subsea structure of claim 13 wherein the subsea structure has a peel strength of at least 50 pli measured between said hydrolytically resistant layer and said epoxide layer using ASTM D6862.

15. The subsea structure of claims 13 wherein said hydrolytically resistant layer retains at least 99% of said initial tensile strength as measured in accordance with the DIN 53504 S2 standard test method and after submersion in standardized seawater for 24 weeks in accordance with ASTM D665.

* * * * *